United States Patent
Keller et al.

(10) Patent No.: US 11,518,234 B1
(45) Date of Patent: *Dec. 6, 2022

(54) POWER AND COOLING SYSTEM FOR UTILITY VEHICLE

(71) Applicant: Hydro-Gear Limited Partnership, Sullivan, IL (US)

(72) Inventors: Scott W. Keller, Charleston, IL (US); Raymond Hauser, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 1119 days.

This patent is subject to a terminal disclaimer.

(21) Appl. No.: 16/131,501

(22) Filed: Sep. 14, 2018

Related U.S. Application Data

(63) Continuation of application No. 15/205,969, filed on Jul. 8, 2016, now Pat. No. 10,093,169.

(Continued)

(51) Int. Cl.
| | |
|---|---|
| *A01D 34/78* | (2006.01) |
| *A01D 69/02* | (2006.01) |
| *B60K 11/02* | (2006.01) |
| *H02K 7/00* | (2006.01) |
| *A01D 69/08* | (2006.01) |
| *A01D 34/66* | (2006.01) |
| *A01D 34/81* | (2006.01) |
| *A01D 101/00* | (2006.01) |

(52) U.S. Cl.
CPC .............. *B60K 11/02* (2013.01); *A01D 34/66* (2013.01); *A01D 34/78* (2013.01); *A01D 34/81* (2013.01); *A01D 69/02* (2013.01); *A01D 69/08* (2013.01); *H02K 7/003* (2013.01); *A01D 2101/00* (2013.01)

(58) Field of Classification Search
CPC ........ A01D 34/78; A01D 69/02; A01D 69/08; F04C 2/102; F04C 15/008
See application file for complete search history.

(56) References Cited

U.S. PATENT DOCUMENTS

| | | | |
|---|---|---|---|
| 3,954,353 A | 5/1976 | Mokesch | |
| 5,156,579 A | 10/1992 | Wakuta et al. | |

(Continued)

FOREIGN PATENT DOCUMENTS

| | | | | |
|---|---|---|---|---|
| CN | 103299779 A | * | 9/2013 | ........... A01D 34/006 |
| EP | 3078525 | | 10/2016 | |
| KR | 1997-0006855 Y1 | * | 7/1997 | ............... B60H 1/32 |

OTHER PUBLICATIONS

U.S. Appl. No. 15/837,838, filed Dec. 11, 2017, 32 pp.
U.S. Appl. No. 16/448,426, filed Jun. 21, 2019, 53 pp.

*Primary Examiner* — Alicia Torres
(74) *Attorney, Agent, or Firm* — Neal, Gerber & Eisenberg LLP

(57) ABSTRACT

A power and cooling assembly is disclosed for use with a vehicle having a deck for a rotatable tool such as a mowing blade. An electric motor is mounted on the deck and used to drive the blades by an output shaft. A circulating pump is connected to a housing of the electric motor and is also driven by the electric motor. The circulating pump is hydraulically connected to at least one sump on the vehicle and at least one electrical component of the vehicle to provide cooling thereto. Additional cooling pumps may be provided on the vehicle and may provide cooling to additional electrical components.

20 Claims, 5 Drawing Sheets

Related U.S. Application Data

(60) Provisional application No. 62/190,501, filed on Jul. 9, 2015.

(56) References Cited

U.S. PATENT DOCUMENTS

| | | | |
|---|---|---|---|
| 5,531,285 | A | 7/1996 | Green |
| 5,718,302 | A | 2/1998 | Hasebe et al. |
| 6,419,460 | B1 | 7/2002 | Dantlgraber |
| 6,450,275 | B1 | 9/2002 | Gabriel et al. |
| 7,211,912 | B2 | 5/2007 | Takenaka et al. |
| 7,528,511 | B2 | 5/2009 | Smith |
| 7,565,943 | B2 | 7/2009 | Herrmann et al. |
| 7,729,118 | B2 | 6/2010 | Lai et al. |
| 7,743,590 | B1 | 6/2010 | Gidden et al. |
| 8,104,555 | B2 | 1/2012 | Pekarsky et al. |
| 8,191,342 | B2 | 6/2012 | Ishii et al. |
| 8,616,315 | B2 | 12/2013 | Kim et al. |
| 10,093,169 | B1 * | 10/2018 | Keller .................... A01D 34/78 |
| 2011/0255919 | A1 | 10/2011 | Graner et al. |
| 2012/0230843 | A1 | 9/2012 | Ravipati et al. |

* cited by examiner

POWER AND COOLING SYSTEM FOR UTILITY VEHICLE

CROSS-REFERENCE

This application is a continuation of U.S. Non-Provisional application Ser. No. 15/205,969, filed on Jul. 8, 2016, which claims the benefit of U.S. Provisional Application Ser. No. 62/190,501, filed on Jul 9, 2015. The prior applications are incorporated herein by reference in its entirety.

BACKGROUND OF THE INVENTION

This invention relates to a combined electric deck motor and circulating pump for use in a drive system that may be used in vehicles such as lawn and garden tractors, stand-on mowers, and the like, including both single transaxle drives and dual transaxle drives for use in zero-turn applications.

SUMMARY OF THE INVENTION

A combined electric deck motor and circulating pump is disclosed herein. More specifically, in an embodiment disclosed herein, a circulating pump is mounted on a housing member of at least one electric deck motor of a mowing deck. The combined electric deck motor/circulating pump configuration taught herein may be used in connection with a vehicle powered by a generator that may include a circulating pump, wherein at least one apparatus on the vehicle is cooled by the circulating pump of the combined electric deck motor/circulating pump.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
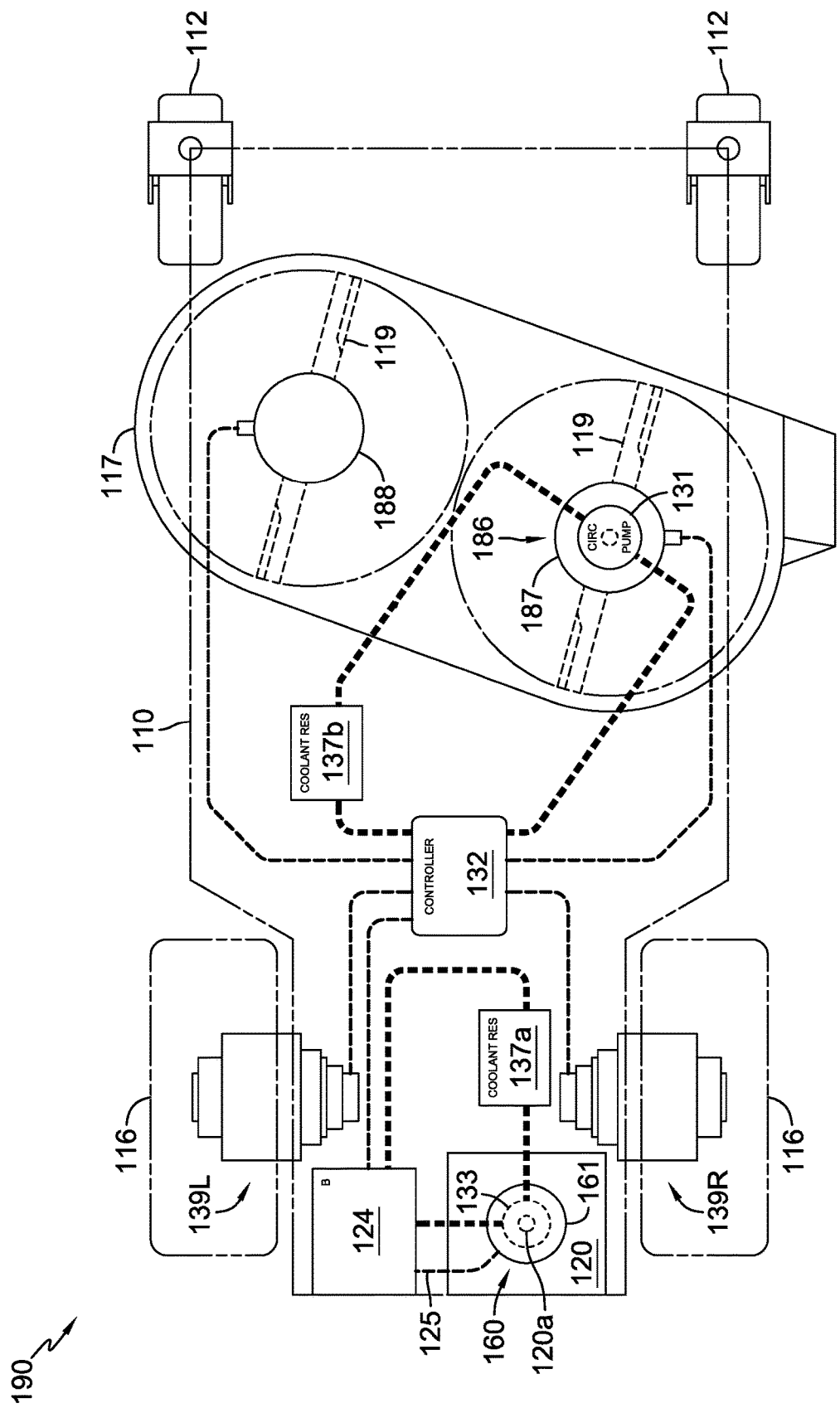
FIG. 1 is a partially schematic drawing of an exemplary vehicle incorporating a combined electric generator and circulating pump assembly and a combined electric deck motor and circulating pump assembly.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. In certain cross-sectional views, not all elements (such as input shafts) are shown as cross-sectioned, where such cross-sectioning would overly complicate the figures and not aid in the understanding of the disclosure. This specification is intended to be taken as a whole and interpreted in accordance with the principles of the invention as taught herein and understood by one of ordinary skill in the art.

FIG. 1 illustrates a riding vehicle 190 including a prime mover 120, a pair of power transfer mechanisms 139L, 139R to power a pair of driven wheels 116. In the depicted embodiment, power transfer mechanisms 139L, 139R are electric wheel motors. Alternatively, other drive mechanisms such as a pair of electric transaxles (not shown) may be used to power the pair of driven wheels 116. Prime mover 120 could also power a hydrostatic drive system (not shown) to drive the wheels 116. A set of caster-type wheels 112 is disposed at the front of frame 110, which also supports a mowing deck 117 that includes at least one mowing blade 119. The combined electric deck motor and circulating pump assembly 186 is used to power a rotating tool, and in this embodiment, the rotating tool consists of the at least one mowing blade 119, and mowing deck 117 also includes a separate electric deck motor 188 that may be as depicted in commonly-owned U.S. Pat. Nos. 8,227,948 or 8,615,976, both of which are incorporated herein by reference. Applicable deck motor control systems are described in commonly-owned U.S. Pat. No. 8,055,399, also incorporated herein by reference. Separate electric deck motor 188 is used to power a second mowing blade 119.

The combined electric deck motor and circulating pump assembly 186 includes an electric deck motor 187 and a circulating pump 131. Electric deck motor 187 may be substantially similar in some respects to electric deck motor 188, with modifications to accommodate the inclusion of circulating pump 131. A prime mover 120, which may be an internal combustion engine, is also disposed on frame 110. It will be understood that operator input controls and an operating seat or platform for the operator of the vehicles disclosed herein would be provided as well.

Figure 5:
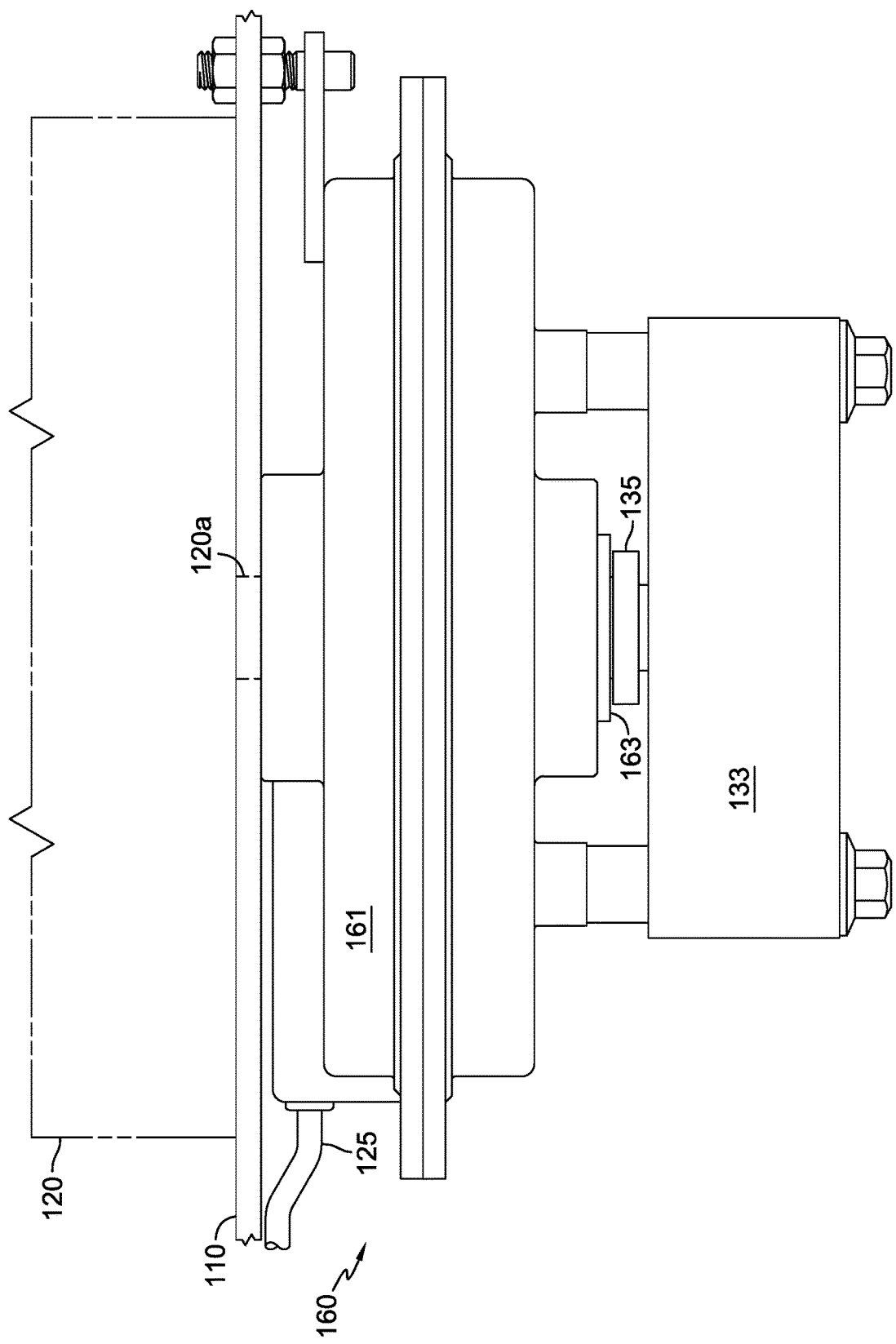
FIG. 5 is a side elevational view of a combined generator and cooling pump assembly attached to a vehicle frame and prime mover.

Vehicle 190 also includes a plurality of electronic components, including controller 132 which is operatively connected to a battery 124, electric wheel motors 139L, 139R, and to electric deck motors 187 and 188. In this embodiment, as shown more clearly in FIG. 5, an output shaft 120a of prime mover 120 drives a combined generator and circulating pump assembly 160. Input tube 163 of generator 161 drives input shaft 135 of circulating pump 133, which is mounted to generator 161. As shown, generator 161 supplies power to battery 124 through conductor 125, and battery 124 in turn supplies power to controller 132. This combined generator and circulating pump assembly 160 can be essentially identical in function and construction to that depicted in commonly-owned pending U.S. patent application Ser. No. 15/170,137, now U.S. Pat. No. 10,106,027, the terms of which are incorporated herein by reference.

A circulating pump 133 of the generator and circulating pump assembly 160 receives cooling fluid from a first coolant reservoir 137a. In this vehicle system, the circulating pump 133 is used to cool the battery 124. Optionally, circulating pump 133 may be used to cool one or more other components of vehicle 190, such as the housings of wheel motors 139L and 139R, for example. A manifold (not shown) may be added to the system to distribute cooling fluid to more than one component of vehicle 190. It will be understood that a conventional generator could be used in place of generator and circulating pump assembly 160 and in combination with electric deck motor and circulating pump assembly 186.

Circulating pump 131 receives cooling fluid from a second coolant reservoir 137b to circulate cooling fluid through controller 132. One or both of the coolant reservoirs 137a, 137b can include a heat exchanger component if needed, dependent on vehicle system requirements. Coolant reservoirs 137a, 137b may be constructed of a material such as aluminum and may include features such as fins to improve heat dissipation.

Figure 2:
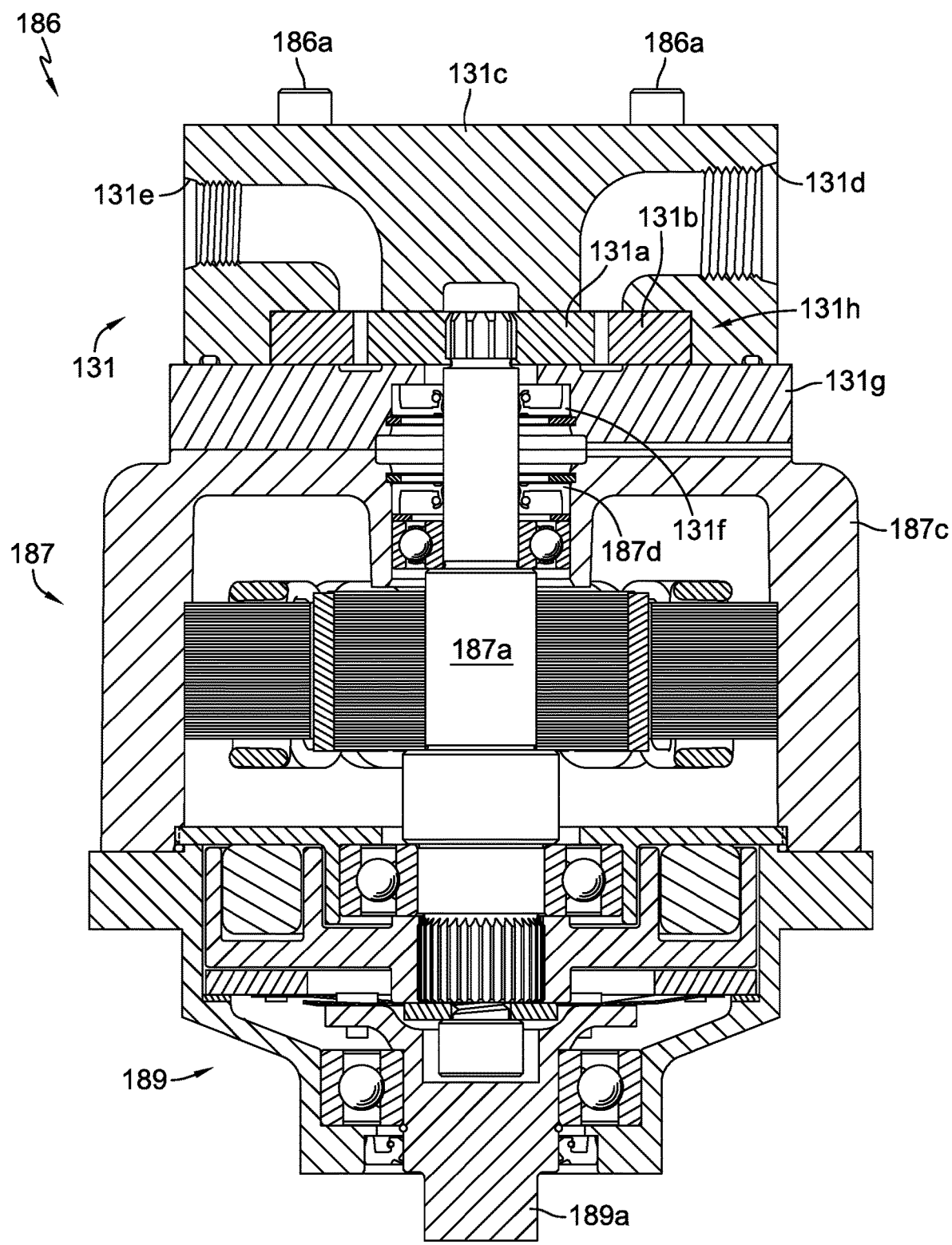
FIG. 2 is a cross sectional view of the combined electric deck motor and circulating pump assembly of FIG. 1.

As shown in FIG. 2, the combined electric deck motor and circulating pump assembly 186 includes an electric deck motor 187 having an output shaft 187a that is drivingly engaged to an integrated clutch-brake mechanism 189 (optional) at one end and to a gerotor-style circulating pump 131 at its other end. In this embodiment, clutch-brake mechanism 189 comprises an output member 189a that is connected by known means to the rotating tool, namely mowing blade 119. It will be understood that output shaft 187a could also be engaged directly to mowing blade 119 if clutch-brake mechanism 189 is not used.

Output shaft 187a extends through a first seal 187d located in electric motor housing 187c and through a second seal 131f located in gerotor running plate 131g to engage inner rotor 131a of circulating pump 131. In this embodiment, gerotor running plate 131g is disposed between motor housing 187c and pump housing 131c. Inner rotor 131a and outer rotor 131b are disposed in cooling fluid in gerotor pocket 131h formed in pump housing 131c. Gerotor running plate 131g provides a running surface for inner rotor 131a and outer rotor 131b, as does the gerotor pocket 131h. A plurality of fasteners 186a extends through pump housing 131c and gerotor running plate 131g to attach circulating pump 131 to motor housing 187c.

Circulating pump 131 includes a fluid inlet 131d and a fluid outlet 131e. The size and specific design of circulating pump 131 may vary based on type of cooling fluid used, viscosity, operating temperature range, duty cycle, etc.

Figure 3:
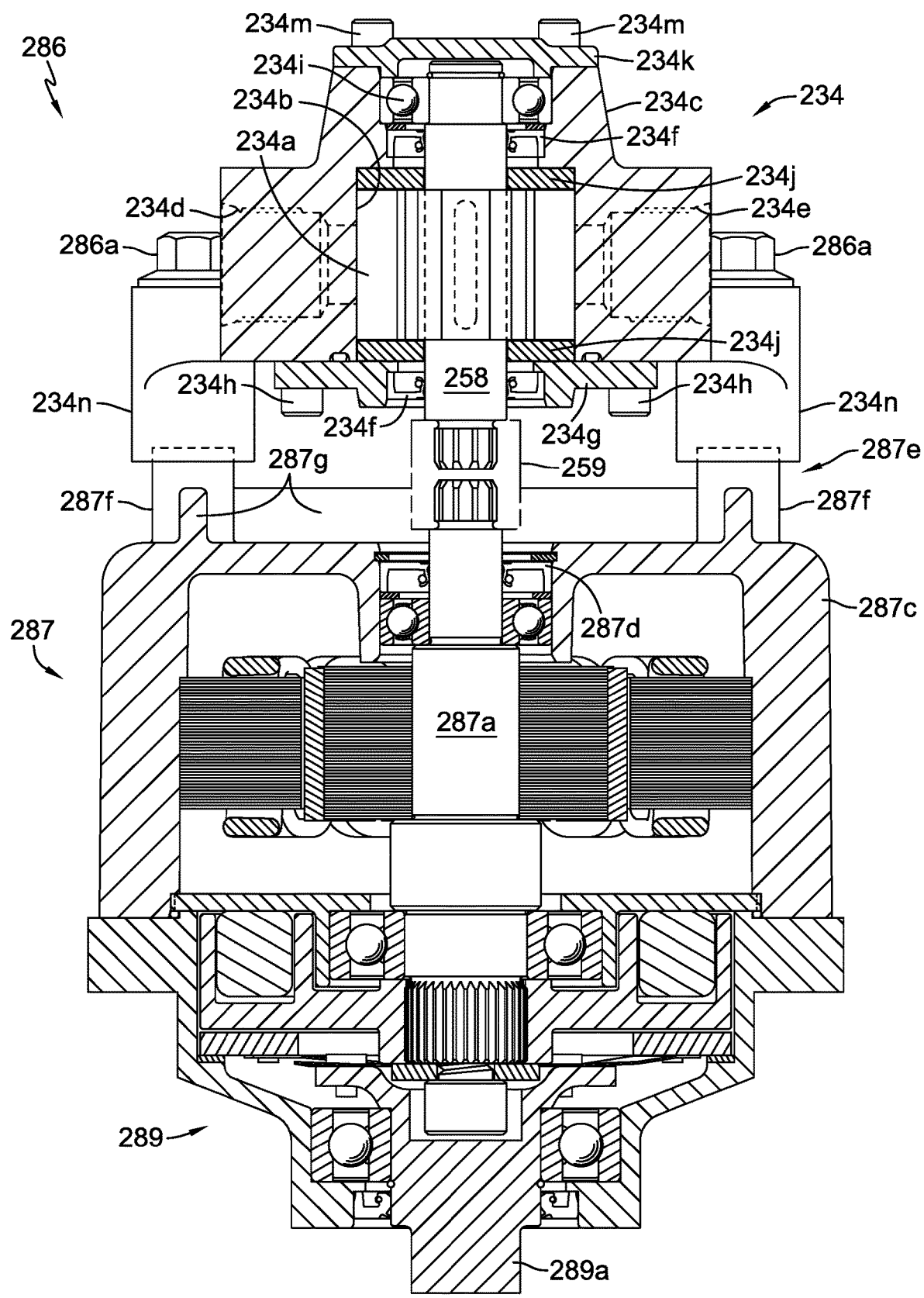
FIG. 3 is a cross sectional view of an alternate embodiment of the combined electric deck motor and circulating pump assembly of FIG. 1.

A combined electric deck motor and circulating pump assembly 286, similar in some aspects to combined electric deck motor and circulating pump assembly 186, is shown in FIG. 3, where it can be seen to include electric deck motor 287 having an output shaft 287a that is drivingly engaged to an integrated clutch-brake mechanism 289 (optional) at one end and to a circulating pump 234 at its other end. Clutch-brake mechanism 289 includes an output shaft 289a.

Circulating pump 234 is attached to motor housing 287c using fasteners 286a. A plurality of piloted mounting bosses 234n is provided for ease of mounting and proper alignment of circulating pump 234 and to create separation to help maintain a temperature differential between the electric deck motor 287 and the circulating pump 234. Additionally, a pump mounting structure 287e comprising a plurality of protruding mounting features 287f (that engage piloted mounting bosses 234n) may be formed on motor housing 287c to further help create separation and improve cooling airflow. Reinforcing ribs 287g may be formed between mounting features 287f to add strength and act as fins to augment heat dissipation.

Output shaft 287a extends through a first seal 287d located in electric motor housing 287c to engage a coupling 259 in a known manner to rotate therewith. An input shaft 258 of circulating pump 234 also engages coupling 259 in a known manner to rotate therewith. Input shaft 258 extends through a second seal 234f located in housing cover 234g to engage a fluid moving element or impeller 234a disposed in cooling fluid in pump chamber 234b of circulating pump 234. Impeller 234a may be made of rubber or an elastomeric material and runs on a pair of wear washers 234j. Input shaft 258 also extends through a third seal 234f located in pump housing 234c and is supported by at least one shaft support bearing 234i mounted in pump housing 234c. An additional shaft support bearing may be added to improve load distribution and shaft alignment if necessary. In the embodiment shown, input shaft 258 extends through the housing cover 234g, which is attached to pump housing 234c with a plurality of fasteners 234h. At the opposite end of input shaft 258, a bearing retention cover 234k is attached to pump housing 234c with a plurality of fasteners 234m to retain bearing 234i and input shaft 258 in pump housing 234c.

Circulating pump 234 includes a fluid inlet 234d and a fluid outlet 234e. The size and specific design of circulating pump 234 may vary based on type of cooling fluid used, viscosity, operating temperature range, duty cycle, etc., For example, the cooling fluid could be a water-based antifreeze solution as is commonly used in automotive applications. Or, it could be a higher viscosity hydraulic fluid. Also, a variety of fluids are available for use in computer cooling systems and battery cooling systems and could be used to cool components of exemplary vehicles 190, 290 or other utility vehicles.

Figure 4:
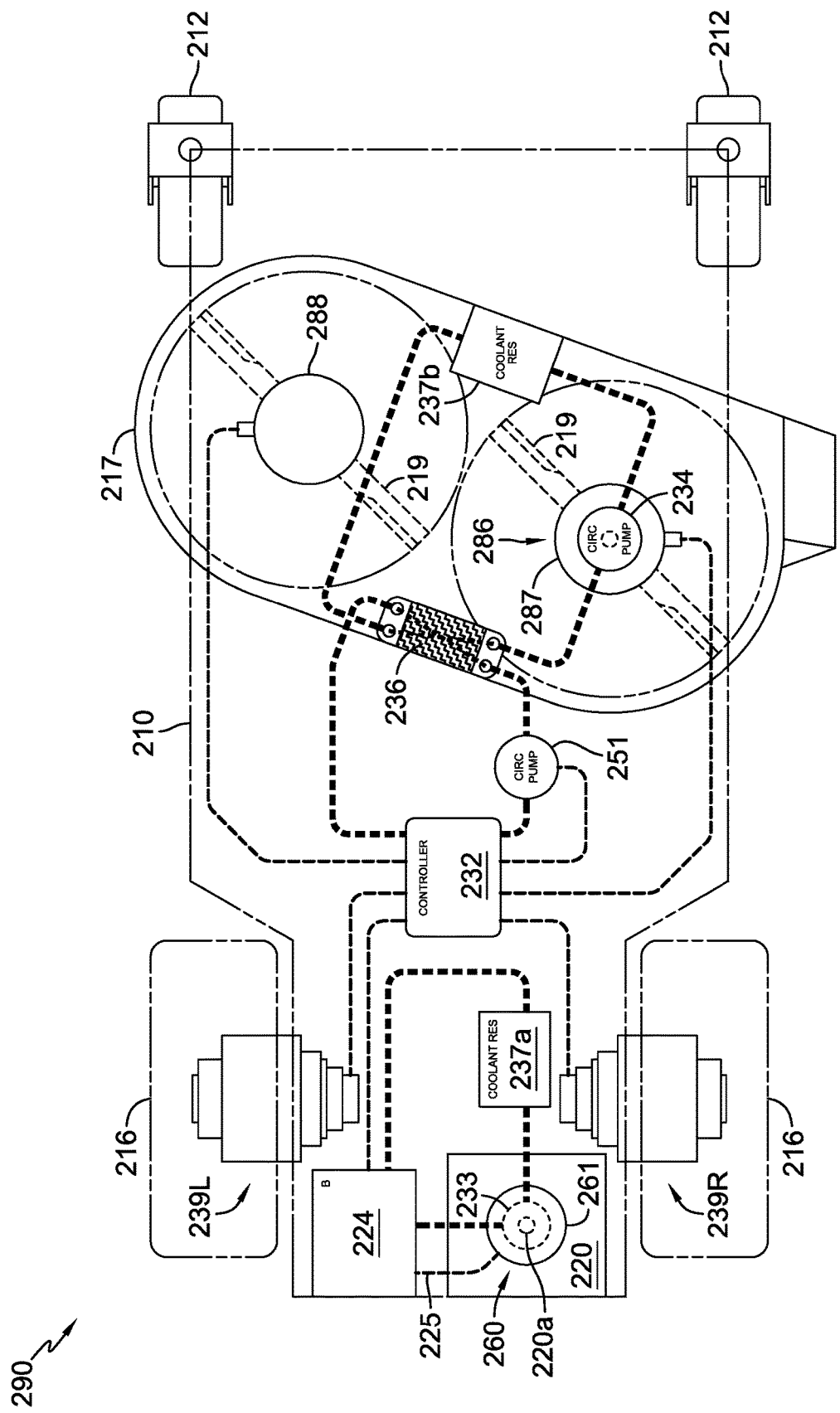
FIG. 4 is a partially schematic drawing of an exemplary vehicle in accordance with another embodiment, wherein the vehicle comprises a combined electric generator and circulating pump assembly, a combined electric deck motor and circulating pump assembly, an additional circulating pump, and a heat exchanger.

FIG. 4 illustrates a riding vehicle 290 including a pair of electric wheel motors 239L, 239R to power a pair of driven wheels 216. A set of caster wheels 212 is disposed at the front of frame 210, which also supports a mowing deck 217 having at least one mowing blade 219 powered by a combined electric deck motor and circulating pump assembly 286. The combined electric deck motor and circulating pump assembly 286 includes an electric deck motor 287 and a circulating pump 234. In this embodiment, mowing deck 217 also includes an electric deck motor 288 that is the same as or similar to deck motor 188 of vehicle 190. Electric deck motors 287 and 288 may also be substantially similar to one another in many respects. Prime mover 220, which may be an internal combustion engine, is also disposed on frame 210. In this embodiment, an output shaft 220a of prime mover 220 drives a combined generator and circulating pump assembly 260.

Vehicle 290 also includes a controller 232 which is operatively connected to a battery 224, electric wheel motors 239L, 239R, electric deck motors 287, 288, and electric circulating pump 251. A generator 261 of generator and circulating pump assembly 260 supplies power to battery 224, which in turn supplies power to controller 232. Similar to circulating pump 133 in vehicle 190, circulating pump 233 of combined generator and circulating pump assembly 260 receives cooling fluid from a first coolant reservoir 237a to cool one or more components of vehicle 290, such as battery 224. Coolant reservoir 237a can include a heat exchanger component if needed, dependent on vehicle system requirements.

In vehicle 290, circulating pump 234 receives cooling fluid from a second coolant reservoir 237b to circulate cooling fluid through heat exchanger 236. A separate circulating pump 251 circulates cooling fluid through heat exchanger 236 and controller 232 to cooperatively cool the controller 232. Separate circulating pump 251 may be of a conventional design, or may be similar in construction to circulating pump 234 absent the motor component. As is known, heat exchangers are available in a variety of configurations and coolants may be circulated in opposite directions through some heat exchangers to improve heat transfer. As shown, coolant reservoir 237b and heat exchanger 236 may be mounted on deck 217. This configuration may help with cooling due to the air flow provided by the mowing blades 219. Optionally, coolant reservoir 237b and heat exchanger 236 may be mounted elsewhere on vehicle frame 210.

It should be noted that the combined electric deck motor and circulating pump assemblies 186, 286 may be used interchangeably in vehicles 190, 290, depending on the cooling fluid used and other specific vehicle system attributes.

It should also be noted that one or more of the combined electric deck motor and circulating pump assemblies 186, 286, may be used to drive other vehicle equipment in addition to or in lieu of one or more blades 119, 219 of mowing decks 117, 217, respectively. Furthermore, either of the pump assemblies 186, 286 could serve as electric circulating pump 251 by omitting the integrated clutch-brake mechanism and modifying the motor housing and output shaft accordingly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A power assembly for use with a vehicle, the power assembly comprising:
   an electric motor comprising a motor housing and a motor output shaft, the motor output shaft having a first end extending out a first side of the motor housing and a second end extending out a second side of the motor housing, opposite the first side; and
   a circulating pump connected to the motor housing and driven by the first end of the motor output shaft, the circulating pump capable of being hydraulically connected to at least one sump and at least one electrical component of the vehicle; and
   a mowing blade driven by the second end of the motor output shaft.

2. The power assembly of claim 1, wherein the circulating pump comprises a gerotor pump.

3. The power assembly of claim 1, further comprising a clutch-brake engaged to and driven by the motor output shaft of the electric motor, wherein the clutch-brake comprises a clutched output engaged to and driving the mowing blade.

4. The power assembly of claim 1, wherein the mowing blade is disposed under a deck, and the motor housing is connected to the deck.

5. The power assembly of claim 1, wherein the circulating pump comprises a pump input shaft engaged to the motor output shaft by means of a coupling.

6. A vehicle, comprising:
   at least one power transfer mechanism disposed on the vehicle and driving at least one of a pair of driven wheels of the vehicle;
   an electric motor comprising a motor housing and a motor output shaft having a first end extending out a first side of the motor housing and a second end extending out a second side of the motor housing, opposite the first side;
   a first circulating pump driven by the first end of the motor output shaft and hydraulically connected to at least one electrical component of the vehicle to provide coolant fluid to the at least one electrical component; and
   a mowing blade driven by the second end of the motor output shaft.

7. The vehicle of claim 6, wherein the at least one power transfer mechanism comprises an electric wheel motor driving a single wheel of the vehicle.

8. The vehicle of claim 7, further comprising a second circulating pump connected to at least a second electrical component of the vehicle to provide coolant fluid to the second electrical component.

9. The vehicle of claim 6, further comprising a clutch-brake engaged to and driven by the motor output shaft, wherein the clutch-brake comprises a clutched output engaged to and driving the mowing blade.

10. The vehicle of claim 6, wherein the at least one power transfer mechanism comprises a pair of electric wheel motors, each of the pair of electric wheel motors engaged to and driving one of the pair of driven wheels.

11. A power and cooling system for a vehicle having a prime mover, a pair of driven wheels, and a deck for at least one mowing blade, the power and cooling system comprising:
   at least one power transfer mechanism disposed on the vehicle and driving one of the pair of driven wheels;
   an electric motor comprising a motor housing and having a motor output shaft having a first end extending out a first side of the motor housing and a second end extending out a second side of the motor housing; and
   a first circulating pump engaged to the motor housing and hydraulically connected to at least one electrical component of the vehicle to provide coolant fluid to the at least one electrical component, wherein the second end of the motor output shaft is connected to and drives the at least one mowing blade.

12. The power and cooling system of claim 11, further comprising a coolant reservoir hydraulically connected to the first circulating pump.

13. The power and cooling system of claim 11, further comprising a generator driven by the prime mover and a controller electrically connected to the generator, to the power transfer mechanism, and to the electric motor.

14. The power and cooling system of claim 13, wherein the power transfer mechanism comprises an electric wheel motor driving a single wheel of the pair of driven wheels.

15. The power and cooling system of claim 13, wherein the first circulating pump is hydraulically connected to the controller and/or a battery to provide cooling fluid thereto.

16. The power and cooling system of claim 13, further comprising a second circulating pump connected to the generator.

17. The power and cooling system of claim 16, further comprising a third circulating pump connected to at least one component of the vehicle.

18. The power and cooling system of claim 13, further comprising a second electric motor disposed on the deck and connected to and controlled by the controller, wherein the at least one mowing blade comprises a first mowing blade and a second mowing blade, and the second electric motor drives the second mowing blade.

19. The power and cooling system of claim 11, wherein the power transfer mechanism comprises a pair of electric wheel motors, each of the pair of electric wheel motors engaged to and driving one of the pair of driven wheels.

20. The power and cooling system of claim 11, further comprising a clutch-brake engaged to and driven by the motor output shaft, wherein the clutch-brake comprises a clutched output engaged to and driving the at least one mowing blade.

\* \* \* \* \*